United States Patent [19]

Balogh

[11] 4,257,645
[45] Mar. 24, 1981

[54] FLEXIBLE SHEET SEAL

[75] Inventor: Thomas K. Balogh, Elk Grove Village, Ill.

[73] Assignee: Schlegel Corporation, Rochester, N.Y.

[21] Appl. No.: 2,893

[22] Filed: Jan. 12, 1979

[51] Int. Cl.³ .............................................. B60P 3/32
[52] U.S. Cl. ..................................... 296/166; 49/491; 138/121
[58] Field of Search ................. 296/166; 49/491, 490; 138/119, 121

[56] References Cited

U.S. PATENT DOCUMENTS

| 3,321,234 | 5/1967 | Harrell et al. | 296/166 |
| 3,638,991 | 2/1972 | Hathaway | 296/166 |
| 3,908,704 | 9/1975 | Clement | 138/121 |
| 4,107,898 | 8/1978 | Andrzejewski | 49/490 |
| 4,114,320 | 9/1978 | Pullan | 49/491 |

Primary Examiner—Robert R. Song
Attorney, Agent, or Firm—Cumpston & Shaw

[57] ABSTRACT

A flexible sheet seal for joining first and second spaced apart members in waterproof and airtight sealing engagement. The sheet seal has gripping members on at least one end thereof for releasably securing the end in sealing engagement with one of the members. In one application, the seal is a hollow bellows seal for joining a window opening in a vehicle cab to an aligned opening in a pickup cap mounted on the vehicle.

8 Claims, 6 Drawing Figures

FLEXIBLE SHEET SEAL

BACKGROUND OF THE INVENTION

1. Field of the Invention

This invention relates generally to seals, and more specifically to a flexible sheet seal.

2. Description of the Prior Art

It is known in the art to join spaced apart members such as a pickup cap to a vehicle cab by a waterproof and airtight seal in the form of an inflatable doughnut. The doughnut is positioned between facing cap and cab surfaces which are normally spaced two to five inches apart. The doughnut, when inflated, bears against the facing surfaces to provide a flexible seal therebetween. A disadvantage of the doughnut seal is that it relies on contact pressure rather than a positive connection, and hence an effective waterproof and airtight seal may not be secured. In addition, the doughnut seal requires attention and maintenance in regard to replacement of air valves, maintaining proper inflation pressure and locating and correcting air leaks as they develop. In the latter case, the seal is temporarily broken causing water and air leakage to occur. Another disadvantage of the doughnut seal is that the rubbing contact between the doughnut surface and the facing surfaces of the cap and cab causes abrasion of the paint on such surfaces resulting in an unsightly appearance. Such rubbing may also cause air leaks in the doughnut. A further disadvantage is that the doughnut seal has a tendency to slip out of sealing position causing water and air leaks to develop. Lastly, the doughnut seal must be slightly deflated while traveling through higher elevations. If this is not done, the reduced ambient pressure may cause the seal to rupture.

It is further known in the prior art to provide a seal between a cap and cab comprising an elongated fin-type strip preferably mounted on the front of the cap. The seal is achieved by butting the fin-type strip against a surface of the cab. This type of seal appears to operate satisfactorily if the cap and cab are tightly butted together, and no relative movement occurs between the cap and cab. Since relative movement between cap and cab occurs most of the time the vehicle is in motion, this is normally accompanied by water and air leakage through the seal.

Another disadvantage of the fin-type strip is that it hardens when the weather is cold, particularly during the winter months. This reduces the flexibility of the strip during relative movement between the cap and cab resulting in a less efficient seal and possible water and air leakage into the cap. Since a fin-type strip seal only works satisfactorily when a relatively close and parallel fit exists between the cap and cab, a cap equipped with such a seal may not be readily interchangeable on different vehicle cabs where the relatively close and parallel fit does not exist. Also, the fin-type strip seal is normally glued or screwed onto the support surface of the cap or cab resulting in an installation which is both time consuming and costly.

It is further known in the prior art to provide a channel-shaped sealing strip, of which U.S. Pat. No. 4,114,320 is exemplary. The sealing strip is mountable on a flange around a door or window opening in a motor vehicle body to prevent water and air leakage into the body. The sealing strip has gripping means by which the strip is mounted on the flange. The gripping means comprises gripping ribs extending longitudinally along the inside surface of the channel and projecting toward each other from the opposite side walls thereof. The rib on one wall is made of a relatively hard flexible material whereas the rib on the opposite wall is made of a relatively softer flexible material.

SUMMARY OF THE INVENTION

In accordance with a preferred embodiment of the invention, a flexible sheet seal is disclosed for joining first and second spaced apart members in waterproof and airtight sealing engagement. The first and second members may, for example, be a pickup cap and cab respectively of a recreational vehicle.

The sheet seal in one aspect comprises a first elongated channel-shaped element releasably secured to one of the first and second members. A flexible sheet material is provided having one end secured to the channel-shaped element. The opposite end of the flexible sheet is secured to the other of the first and second members.

In another aspect of the invention, the first member has a flange. Also, the first channel-shaped element has gripping ribs extending longitudinally along the inside surface of the channel. The ribs project toward each other from the opposite side walls thereof for gripping the flange in waterproof and air-tight sealing engagement.

In still another aspect of the invention, the sheet material is pleated. Preferably, one fold of each pleat is of greater width than the other fold to facilitate smooth folding of the folds without any wrinkling.

In a more specific aspect of the invention, the seal comprises a boot seal for joining a first opening of a first enclosure such as a pickup cap to a second opening of a second enclosure such as a vehicle cab. The seal comprises first and second elongated endless channel-shaped elements in alignment with and releasably secured to the first and second openings respectively. A hollow bellows formed from a flexible pleated material has one open end secured to the first element, and its opposite open end secured to the second element. The bellows has a plurality of pleated convolutions in which each pleated convolution has one fold of one width and another fold of a greater width. Each channel-shaped element has gripping ribs extending longitudinally along the inside surface of the channel and projecting toward each other from the opposite side walls thereof.

The primary advantages of the flexible sheet seal of this invention is that it, for example, provides (1) positive sealing engagement between the seal and facing surfaces on the cap and cab, (2) allows for twisting and relative movement between the cap and cab without breaking the seal (3) may be installed quickly and easily, (4) provides a finished appearance when viewed from inside or outside of the cap or cab, and (5) allows and accommodates a gap of varying size between facing surfaces of the cap and cab, which facing surfaces may further be non-parallel and non-planar.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
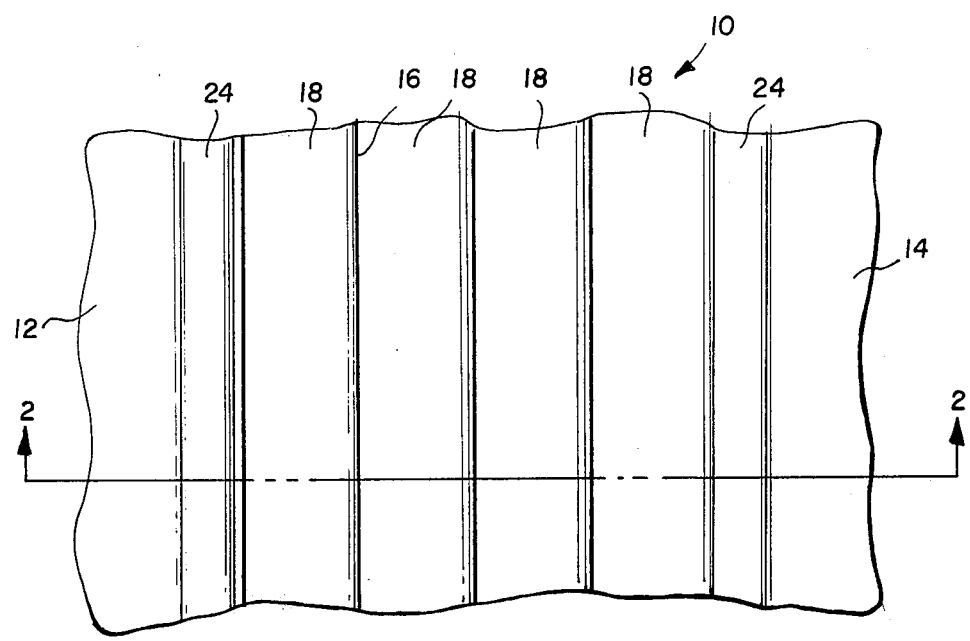
FIG. 1 is a top plan view of a preferred embodiment of a flexible sheet seal of this invention.
Figure 2:
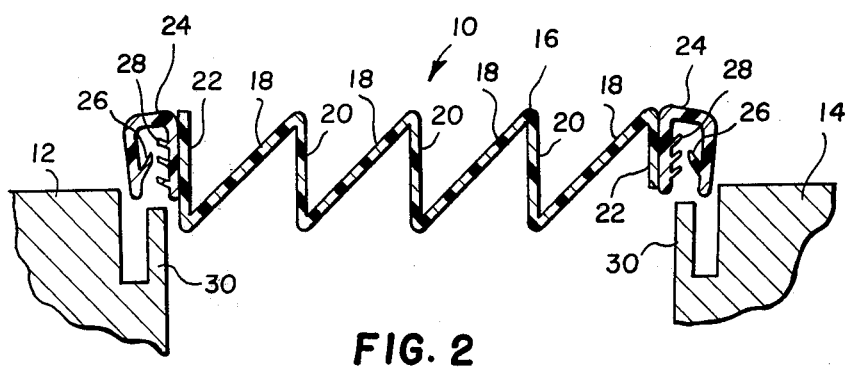
FIG. 2 is a section view taken substantially along line 2—2 of FIG. 1 showing the sheet seal in position to be secured to spaced apart members.
Figure 3:
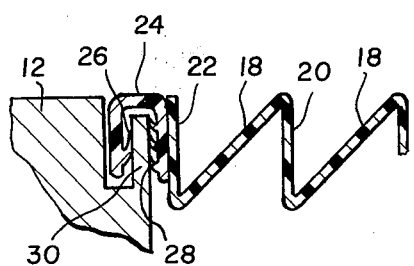
FIG. 3 is a view similar to FIG. 2 showing the sheet seal joining the members in sealing relation.

With reference to FIGS. 1-3, a preferred embodiment of a flexible sheet seal 10 is disclosed for joining first and second spaced apart members 12, 14 in waterproof and airtight sealing relation. The flexible sheet seal 10 comprises a sheet material 16 formed from any suitable flexible material, such as, for example, natural or thermo-plastic rubber, a modified polyvinyl chloride or an elastomer with a fabric substrate. The flexible material should be capable of accommodating summer and winter temperatures ranging from around −40° F. to around 200° F. The material should preferably be ultraviolet stabilized to preclude deterioration and failure of the material due to exposure to the sun.

The sheet material 16 is preferably pleated to allow for longitudinal expansion and contraction of the sheet material to accommodate a varying space or gap between the support members 12, 14. One fold 18 of each pleat has a width greater than the width of the other fold 20 to allow the folds to overlap and yield a smooth surface when the pleat is bent or turned along a curved path of small radius. If the folds 18, 20 are of equal width, they have a tendency to wrinkle or buckle and provide an unsmooth and unfinished appearance.

Each end flap 22 of the sheet material 16 is secured to a surface of one leg of an elongated channel-shaped gripping element 24, preferably by heat sealing or bonding. The channel 24 is preferably formed from a polyvinyl chloride material, and has a gripping rib 26 of relatively hard material extending longitudinally along one inside surface of the channel. The channel further has a plurality of gripping ribs 28 of relatively softer material extending longitudinally along the other inside surface of the channel. When each channel element 24 is pressed onto a flange 30 of member 12 as seen in FIG. 3, the harder rib 26 forces the flange against the softer ribs 28. The softer ribs collapse providing an excellent seal between the inside surface of channel 24 and outer surface of the flange 30.

Figure 4:
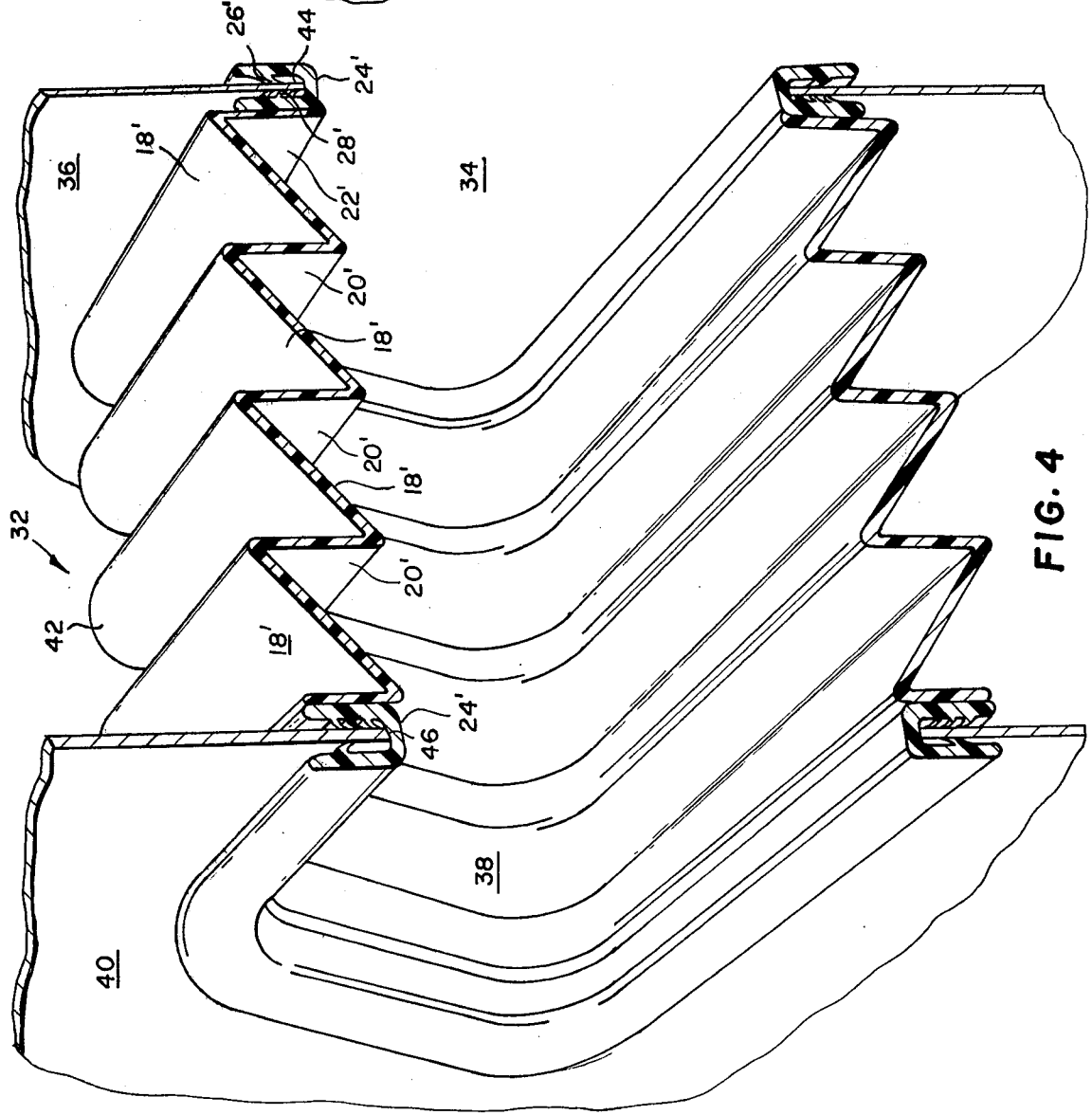
FIG. 4 is a perspective view in section of a preferred embodiment of a flexible boot seal of this invention.

With reference to FIG. 4, a flexible boot seal 32 is disclosed for joining a first opening 34 of a first enclosure 36 such as a truck cab to an aligned second opening 38 of a second enclosure 40 such as a pickup cap. The seal 32 comprises a hollow bellows 42 formed from a flexible pleated material similar to the sheet material described heretofore, and designated by the same numerals primed. Each open end flap 22' of the bellows extends inwardly toward the axis of the bellows and is secured preferably by heat sealing or bonding to endless channel-shaped elements 24'. The channels face outwardly from the axis of the bellows and are pressed onto flanges 44, 46 which encircle the openings 34, 38 respectively. The flanges 44, 46 are exposed when the windows contained therein are removed. The gripping channels 24' join the openings 34, 38 in the cab and cap 36, 40 respectively in waterproof and air tight sealing relation.

Figure 5:
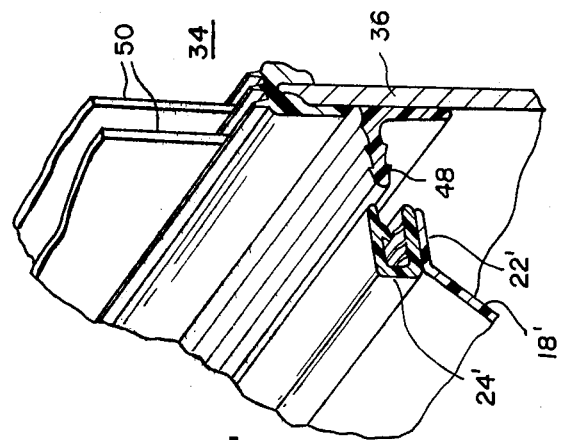
FIG. 5 is a segmental view in perspective showing a modification of the means for releasably securing the seal to a support flange.

With reference to FIG. 5, the end flap 22' of the boot seal 32 extends outwardly along the longitudinal axis of the bellows 42. The end flap 22' is secured to a channel gripping element 24' in position to be pressed onto a serrated flange 48. The flange 48 is mounted on the cab and/or cap in a position encircling the window opening 34. In this embodiment, the sliding windows 50 do not have to be removed.

Figure 6:
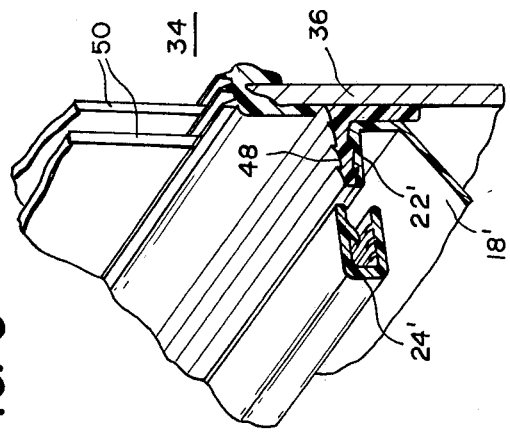
FIG. 6 is a segmental view in perspective showing still another modification of the seal securing means.

With reference to FIG. 6, the end flap 22' of the boot extends inwardly along the longitudinal axis of the bellows 42. The end flap 22' is positioned adjacent the flange 48, and the channel gripping element 24' pushed over flange 48 and end flap 22'.

With reference to the drawings, channel gripping elements 24, 24' are shown at each end of the flexible sheet material 16. However, in some applications, a channel gripping element 24 may be provided on only one end of the seal, and other means provided for securing the opposite end of the seal to a support member. For example, with reference to FIG. 4, one end of a boot seal 32 may be rigidly secured by any suitable means to a pickup cap 40 in a position encircling the cap window 38. A channel gripping element 24 is provided as described heretofore on the opposite end of the seal for releasably securing the boot seal to a flange 44 encircling the window opening 34 of the pickup cab 36.

The invention has been described in detail with particular reference to preferred embodiments, but it will be understood that variations and modifications can be effected within the spirit and scope of the invention as described.

What is claimed is:

1. A flexible sheet seal for joining first and second spaced apart flange members in waterproof and airtight sealing engagement for sealing the space spanning the flange members comprising:
   a first elongated channel-shaped element of said sheet seal adapted to be pressed in sealing engagement onto the first flange member;
   a flexible sheet material having one end secured in sealing engagement only to an outer surface portion of one leg of the first channel-shaped element; and
   means coupled to the opposite end of the sheet material for securing the opposite end to the second flange member in sealing engagement.

2. The sheet seal of claim 1 wherein the first channel element has gripping ribs extending longitudinally along the inside surface of the channel and projecting toward each other from the opposite side walls thereof for gripping the first flange member in sealing engagement.

3. The sheet seal of claim 1 wherein the sheet material is pleated, and each pleat has one fold of a width greater than its other fold.

4. A boot seal for joining in waterproof and airtight sealing relation a first opening of a first enclosure encircled by an endless first flange to a second opening of a second enclosure encircled by an endless second flange and spaced from the first enclosure comprising:
   a first elongated endless channel-shaped element adapted to be positioned to encircle the first opening and to be pressed onto the entire first flange for connecting the first channel-shaped element in sealing engagement to the first flange;

a hollow bellows formed from a flexible pleated material, the bellows having one open end secured in sealing engagement only to a portion of one leg of the first channel-shaped element; and means coupled to the opposite open end of the bellows for securing the opposite open end in sealing engagement to the second enclosure with the opposite open end positioned to encircle the second opening.

5. The boot seal of claim 4 wherein the first channel element has gripping ribs extending longitudinally along the inside surface of the channel and projecting toward each other from the opposite side walls thereof for gripping the first flange in sealing engagement.

6. The boot seal of claim 4 wherein the securing means comprises a second elongated endless channel-shaped element adapted to be pressed into the entire second flange for connecting the second channel-shaped element to the second flange in sealing engagement, and the opposite open end of the bellows is secured in sealing engagement only to an outer surface portion of one leg of the second channel-shaped element.

7. The boot seal of claim 6 wherein the first and second channel-shaped elements have first and second gripping ribs respectively extending longitudinally along the inside surface of the first and second channels respectively and projecting toward each other from the opposite side walls thereof for gripping the first and second flanges in sealing engagement when mounted thereon.

8. The boot seal of claim 4 wherein the bellows has a plurality of pleated convolutions, and each pleated convolution has one fold of a width greater than its other fold.

* * * * *